United States Patent
Champlin

(12) 
(10) Patent No.: US 6,357,957 B1
(45) Date of Patent: Mar. 19, 2002

(54) FASTENER ASSEMBLY FOR JOINING TWO INTERIOR PANELS

(75) Inventor: Matthew J. Champlin, Clawson, MI (US)

(73) Assignee: Magna Interior Systems, Inc., Aurora (CA)

( * ) Notice: Subject to any disclaimer, the term of this patent is extended or adjusted under 35 U.S.C. 154(b) by 0 days.

(21) Appl. No.: 09/463,083
(22) PCT Filed: Sep. 25, 1998
(86) PCT No.: PCT/CA98/00897
§ 371 Date: Mar. 30, 2000
§ 102(e) Date: Mar. 30, 2000
(87) PCT Pub. No.: WO99/16642
PCT Pub. Date: Apr. 8, 1999

Related U.S. Application Data
(60) Provisional application No. 60/060,175, filed on Sep. 26, 1997.

(51) Int. Cl.$^7$ .............................................. B62D 25/14
(52) U.S. Cl. ................... 403/256; 403/263; 403/374.3; 403/375; 296/72
(58) Field of Search ................. 403/256, 240, 403/245, 246, 263, 262, 261, 360, 374.3, 375; 276/191, 29, 35.1, 36, 37.8, 37.12, 72

(56) References Cited

U.S. PATENT DOCUMENTS

| | | | |
|---|---|---|---|
| 2,163,134 A | | 6/1939 | Semion |
| 2,747,638 A | * | 5/1956 | Cederquist .................. 411/104 |
| 2,815,997 A | * | 12/1957 | Korb ........................ 403/52 X |
| 3,771,785 A | * | 11/1973 | Speyer .................... 403/375 X |
| 4,732,281 A | * | 3/1988 | Hall, II et al. .......... 403/261 X |
| 4,877,364 A | | 10/1989 | Sorrentino |
| 5,076,723 A | * | 12/1991 | Berger ..................... 403/245 X |
| 5,522,304 A | * | 6/1996 | Kampichler et al. ..... 403/375 X |
| 5,615,080 A | * | 3/1997 | Nishitani et al. ............ 361/664 |
| 5,647,174 A | * | 7/1997 | Mattarelli ............ 403/374.3 X |
| 5,663,866 A | * | 9/1997 | Ichikawa et al. ........... 361/643 |
| 5,836,787 A | * | 11/1998 | Kodama ..................... 439/567 |
| 5,845,453 A | * | 12/1998 | Goya ..................... 403/246 X |
| 5,904,441 A | * | 5/1999 | Kodama et al. ............ 403/337 |
| 5,934,819 A | * | 8/1999 | Mangold ................ 403/256 X |
| 6,033,145 A | * | 6/2000 | Xu et al. ..................... 403/256 |
| 6,070,295 A | * | 6/2000 | Hulsebus ................ 403/375 X |

FOREIGN PATENT DOCUMENTS

| | | |
|---|---|---|
| EP | 0747604 | 12/1996 |
| EP | 0615072 | 6/1997 |
| EP | 0847903 | 6/1998 |
| GB | 1140106 | 1/1969 |

* cited by examiner

Primary Examiner—Lynne H. Browne
Assistant Examiner—David E. Bochna
(74) Attorney, Agent, or Firm—Howard & Howard

(57) ABSTRACT

A fastener assembly attaches and aligns two panels. The fastener assembly has a connector member (20), a support platform (66) and a tab (80). The connector member has a head (26), a threaded portion (32) and an annular groove (36). The support platform (66) is mounted on a first panel. The support platform (66) threadingly engages the threaded portion (32) of the connector member (20). The tab (80) is mounted on a second panel. The tab has an opening (82) for receiving the annular groove (36) of the connector member (20) in a supporting relation. Rotation of the connector member (20) moves the second panel towards and away from the first panel in a direction of draw to space the second panel relative to the first panel.

14 Claims, 4 Drawing Sheets

FASTENER ASSEMBLY FOR JOINING TWO INTERIOR PANELS

This application is a 371 of PCT/CA98/00897 filed Sep. 25, 1998 which claims benefit of Prov. No. 60/060,175 filed Sep. 26, 1997.

FIELD OF INVENTION

This invention relates to a fastener assembly for joining two interior panels. In particular, this invention relates to a fastener assembly which supports a panel to facilitate margin adjustment.

BACKGROUND OF INVENTION

Using conventional fasteners of the prior art, motor vehicle floor consoles are difficult to mount on instrument panels for several reasons. The instrument panel is not movable and the unattached console has to be moved to the instrument panel and held in position by the installer until one or more fasteners are put in place and tightened to hold the two structures together. A console is typically large and heavy and the space in which the installer has to work is very tight and limited, so holding a console in position while simultaneously trying to put a fastener in place and tightening the same is difficult and time consuming. The problem is compounded by the fact that prior art fasteners generally have to be inserted through a plurality of aligned apertures, some of which are on the instrument panel and some of which are on the console. Hence, the installer has to align the apertures on the console and the instrument panel, insert the fastener through both, and hold the console in the aligned position while the fastener is tightened. Aligning the apertures for the use of prior art fasteners is difficult not only because of the size and weight of the console, but also because the apertures are usually found on the underside of or on the inside of the instrument panel or both and on a portion of the console that is positioned under or inside of the instrument panel when the apertures are aligned. The fastener must also be tightened the proper amount to establish the correct vertical relationship between the two structures which is difficult using prior art fasteners.

SUMMARY OF THE INVENTION

The disadvantages of the prior art may be overcome by providing a connector which is easy to align and engage the console and then to draw the console towards the instrument panel.

According to one aspect of the invention, there is provided a fastener assembly which attaches and aligns two panels. The fastener assembly has a connector member, a support platform and a tab. The connector member has a head, a threaded portion and an annular groove. The support platform is mounted on a first panel. The support platform threadingly engages the threaded portion of the connector member. The tab is mounted on a second panel. The tab has an opening for receiving the annular groove of the connector member in a supporting relation. Rotation of the connector member moves the second panel towards and away from the first panel in a direction of draw to space the second panel relative to the first panel and present a predetermined gap therebetween.

According to another aspect of the invention, there is provided a method for installing a supported panel to a supporting panel. The method includes the steps of:

pre-assembling a connector member to the supporting panel, the connector member having an annular groove, providing the supported panel with a tab, the tab having an opening for receiving the annular groove of the connector member, interengaging the connector member with the tab in a supporting relation, and rotating the connector member to move the supported panel towards and away from the supporting panel in a direction of draw present a predetermined gap between the supporting panel and the supported panel.

DETAIL DESCRIPTION OF THE PREFERRED EMBODIMENT

Figure 1:
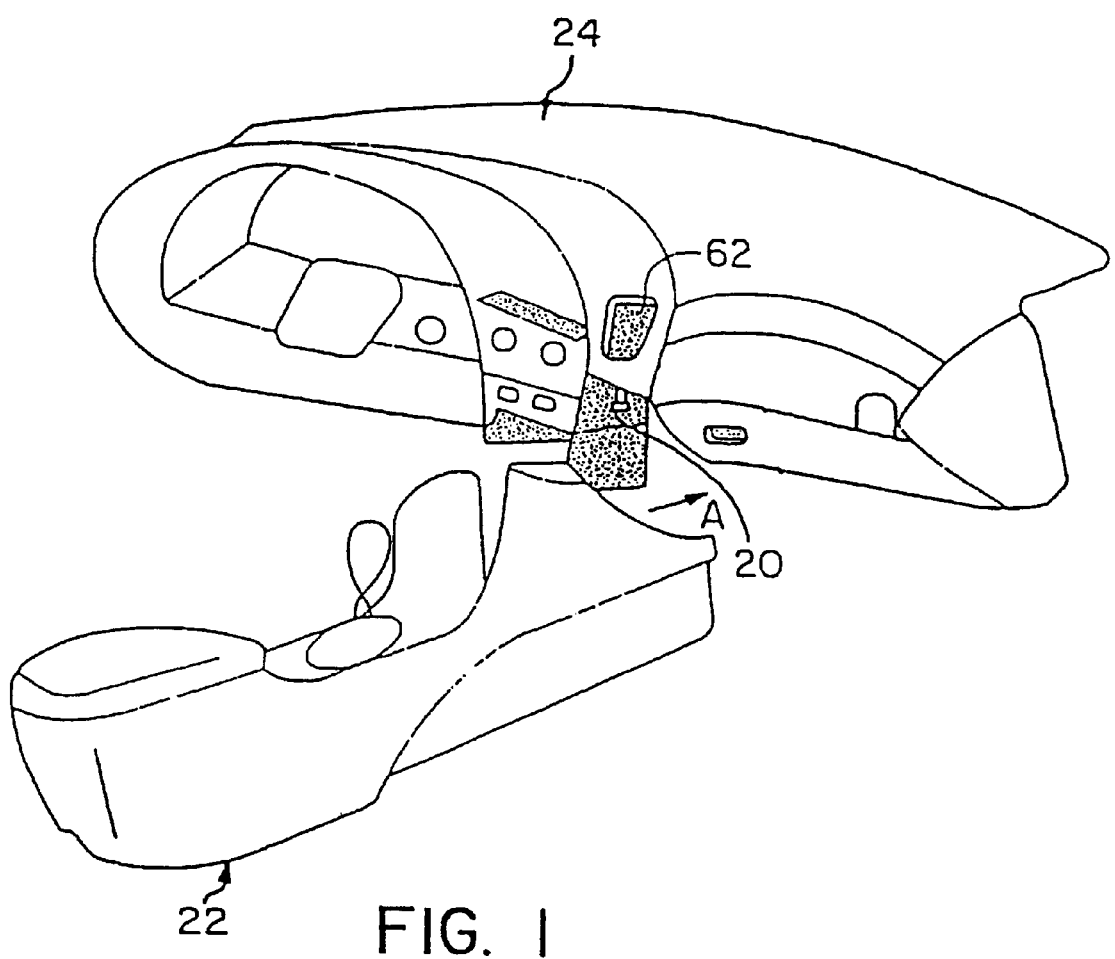
FIG. 1 is a perspective view showing a free end of a connector member of a fastener of the present invention in a pre-assembled position.
Figure 2:
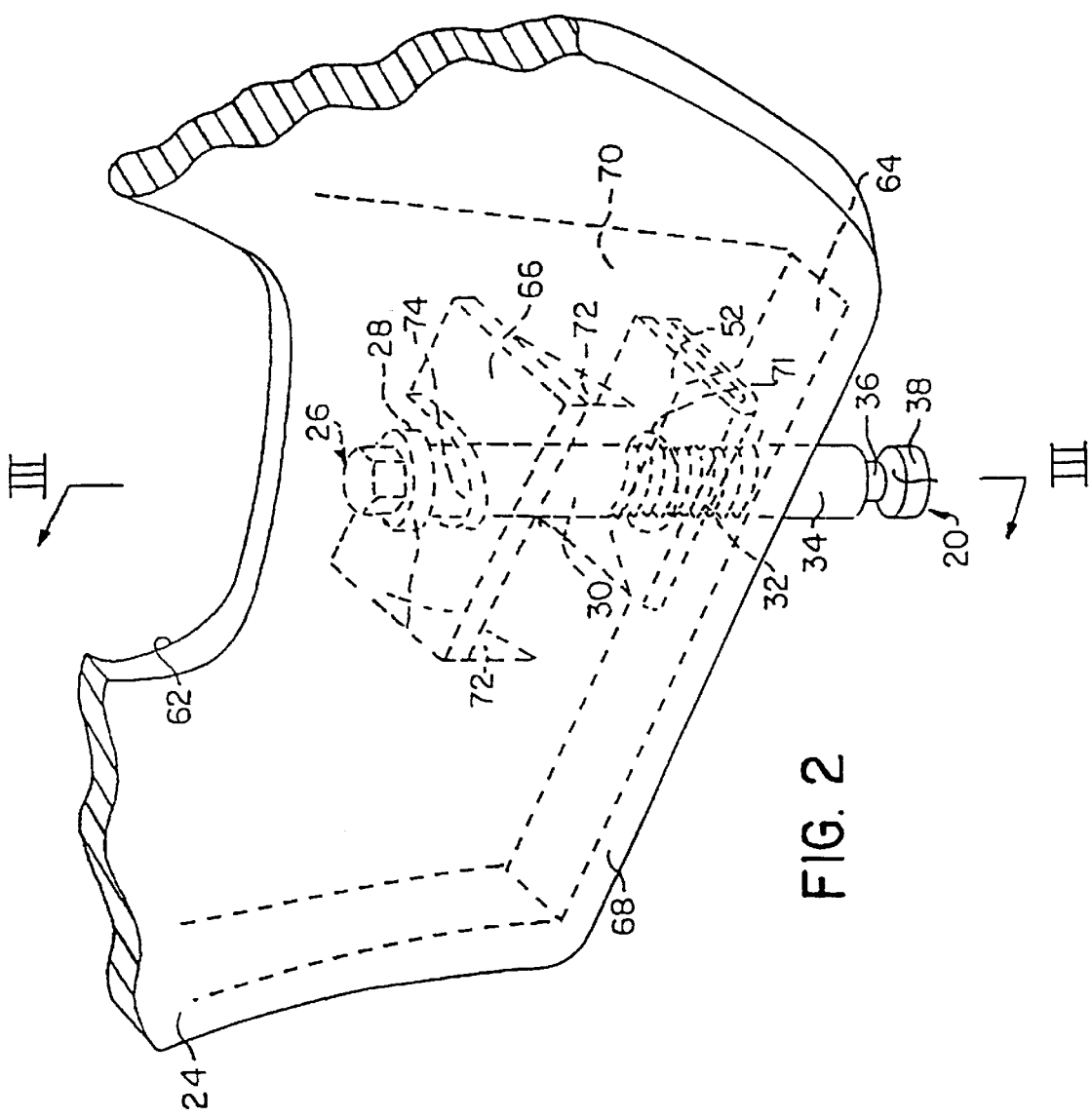
FIG. 2 is a perspective view of the fastener assembly according to the present invention with the connector member installed in a pre-assembled position on an instrument panel.

Referring now more particularly to the drawings, there is shown in FIG. 1 the preferred embodiment of a fastener assembly of the present invention, including a connector member, generally designated 20, for installing a motor vehicle floor console 22 on a vehicle instrument panel, or dash board, 24. Although the present invention is being described in relation to a floor console 22 and an instrument panel 24, it is expressly understood that the present invention is applicable to join any two interior panels, including joining a door panel to a door frame.

Figure 3:
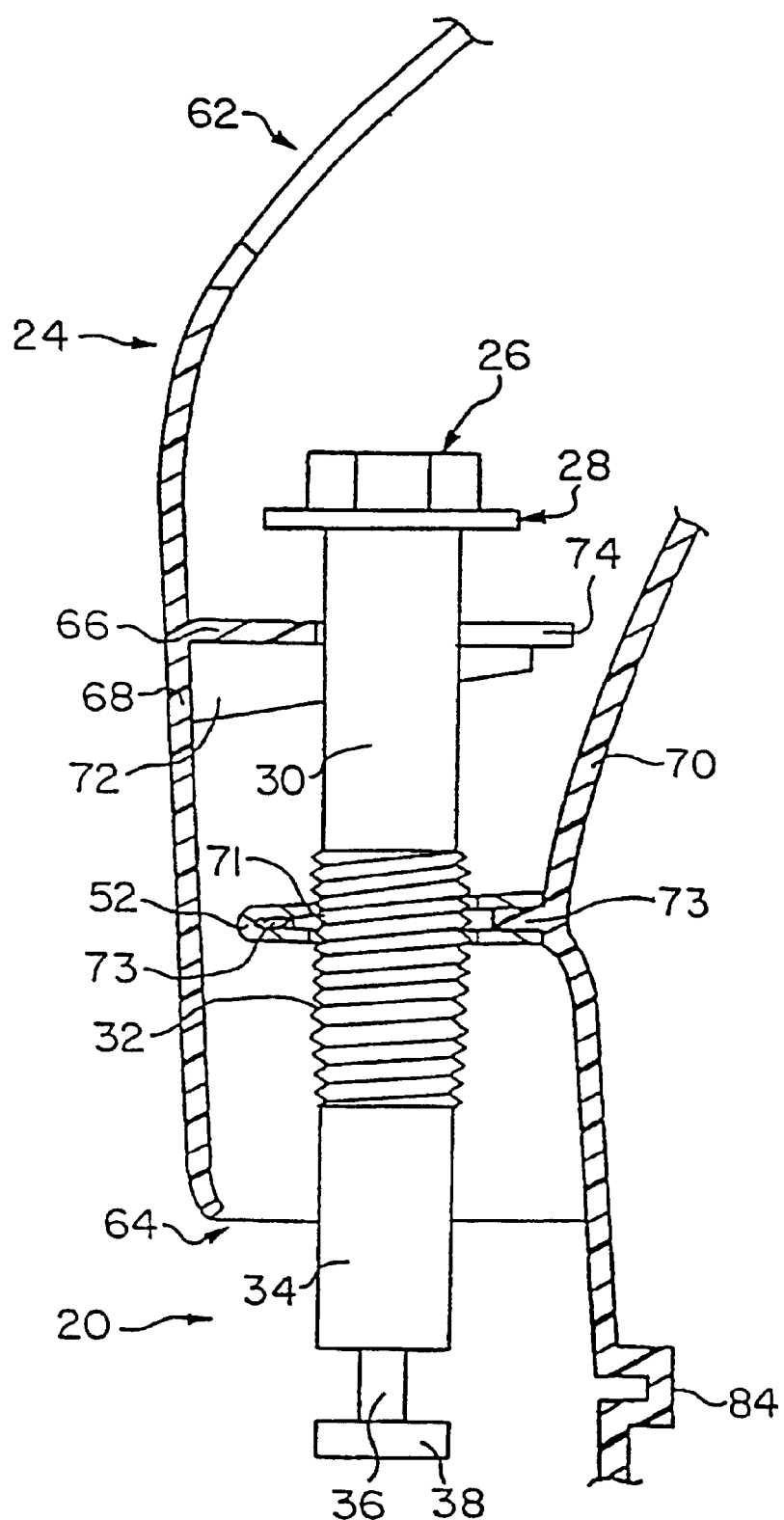
FIG. 3 is a side view of the connector member of the fastener assembly and a fragmentary cross sectional view of the instrument panel in which the connector member is installed taken along the line III—III in FIG. 2.

Referring to FIG. 3, the connector member 20 is a generally cylindrical, elongated member which is comprised of a head 26, a flange 28, an elongated upper body portion 30, a central threaded portion 32, an elongated lower body portion 34, an engagement guide 36 and a cylindrical base 38.

The head 26 is preferably hexagonal to facilitate engagement with the hand tool 40, preferably a conventional socket wrench, in a manner well known in the art. The head 26 merges with the flange 28.

The central threaded portion 32 defines a continuous thread which threadably engages a support platform in the form of clip 52 on an interior portion of the instrument panel 24 during the console installation process as will be explained below. Distal from and adjacent to the central threaded portion 32 of the connector member 20 is the integral cylindrical lower body portion 34. The engagement guide 36 is disposed between the cylindrical lower body portion 34 and the base 38. The engagement guide 36 is an annular groove.

The instrument panel 24 has panel opening 62 which is located near an interface between the instrument panel 24 and the console 22. Panel opening provides access to the connector member 20 during installation. Mounted on an inner face of wall 68 of the instrument panel is an alignment platform 66. The alignment platform 66 is preferably integrally formed on rear wall 68 and is provided with side support gussets 72 to maintain the top surface of the platform member 66 essentially perpendicularly thereto. The front edge of the alignment platform 66 has a U-shaped notch 74 which slidingly receives the connector member 20. The alignment platform 66 is positioned relative to support platform 52 to generally align the connector member 20 in an orientation of a line of draw.

The instrument panel 24 has an inner wall 70 which has a support platform in the form of clip 52. The clip 52 is preferably a bended or folded elongated flat piece of metal having folded support apertures 71 for threadingly engaging the threaded portion 32 of the connector member 20. The clip 52 is secured to the interior of the instrument panel 24 by pressing the clip 52 onto a support flange 73 which is formed integrally on outer face 70.

A groove 84 is provided along the front of inner wall 70 of the instrument panel 24. The groove 84 is sized to receive flange 76 on console 22.

Console 22 has a forwardly projecting horizontal console attachment flange 76 that is perpendicular to and integrally formed with a truncated vertical flange support member 78. The console attachment flange 76 has a tab 80 which has a keyhole aperture 82 including an enlarged rounded end 86 and a narrow elongated slotted end 88. Rounded end 86 is sized to receive end 38 of the connector member 20. Keyhole 82 serve as the point of initial entry for interengagement and supporting attachment, respectively, with the engagement guide 36 of the connector member 20.

It is now apparent to those skilled in the art that other configurations of the keyhole aperture 82 will provide satisfactory results, provided the engagement guide 36 interengages with the attachment flange 76. Such configurations include a wedge shape aperture or a slot opening to the leading edge of the attachment flange.

Installation of a Console Using the Connector Member

The installation process begins by mounting or "pre-assembling" the connector member 20 on the supporting panel, in this case, the instrument panel 24. To pre-assemble the connector member 20, it is first lowered through the opening 62 and inserted through U-shaped notch 74 and aperture 71 to thread the central threaded portion 32 onto clip 52. When the connector member 20 is in this position, the cylindrical upper body portion 30 is positioned within the U-shaped notch 74 and the flange 28 is spaced relatively above the top surface of the upper platform 66. The engagement guide 36 will be positioned opposite the groove 84.

Figure 4:
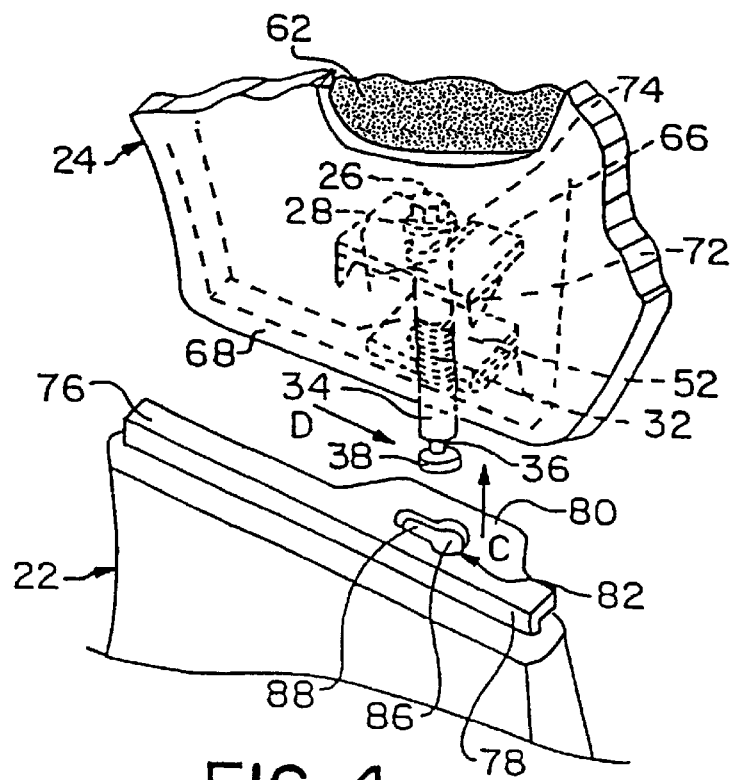
FIG. 4 is a partial perspective view of the console and instrument panel in accordance with the present invention.
Figure 5:
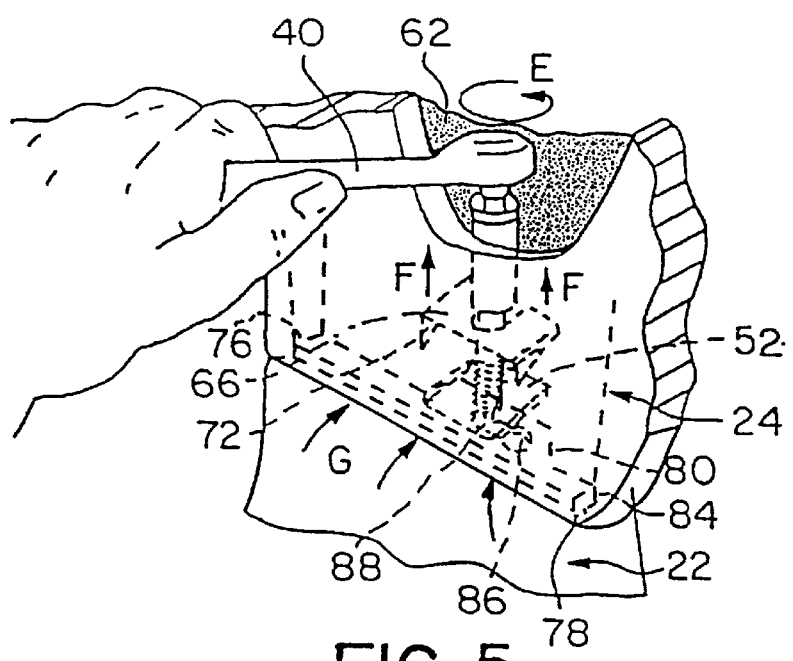
FIG. 5 is a partial perspective view showing the console interengaged with the instrument panel and the connector member being manually manipulated to establish a preset gap between the console and the instrument panel.

Once the connector member 20 is in the pre-assembled position, the supported panel, in this case, the console 22 is moved towards the instrument panel as indicated by the arrow A. The console 22 is advanced until the keyhole 82 is approximately vertically aligned with the connector member 20 as shown in FIG. 5, i.e. the enlarged end 86 of the keyhole 82 is aligned with the longitudinal axis of the connector member 20. The front end of the console 22 is then moved upwardly towards the connector member 20 as indicated by the directional arrow C in FIG. 4. The console 22 is moved laterally in the direction indicated by the arrow labeled D so that the guide 36 slides to the slotted end 88 of the keyhole 82. Console 22 is in a supporting relation with the instrument panel 24. The front edge of the attachment flange 76 is then placed in the groove 84 along the front wall structure 70.

The next step in the installation process is to draw the console 22 and the instrument panel 24 together to a preset gap to establish the proper vertical relationship therebetween. The connector member 20 is initially in a lower position than the installed position thereof, and thus the connector member 20 must be "backed off" or raised relative to the clip 52 in a line of draw as indicated by the arrows labeled F in FIG. 5 by rotating the connector member 20 in the direction indicated by the directional arrow E (assuming a right-hand thread) until the console 22 and the instrument panel 24 are drawn together. Since the edge of flange 76 is inserted in the groove 84, the console will rotate thereabout. The directional arrows labeled G indicate the motion of the console 22 as it is drawn toward the instrument panel 24.

When the console 22 is first placed on the connector member 20, the back end of the attachment flange 76 is slightly lower than it will be after the installation process is completed and therefore the seam formed between the instrument panel 24 and the console 22 is slightly widened. This raising of the connector member 20 simultaneously elevates the attachment flange 76. The console 22 is raised in this manner until the pre-set gap is established between the console 22 and the instrument panel 24. The instrument panel 24 is shaped to receive the console 22 so that no connecting hardware is visible after assembly.

Alternatively, the console 22 can be installed on the instrument panel 24 placing the connecting member into the slotted end 88 of the keyhole 82 as described above and then, instead of immediately placing the front edge of the attachment flange 76 into the groove 84, rotating the connector member 20 in the direction indicated by letter E in FIG. 5 to raise the console 22 relative to the instrument panel 24 until the attachment flange 76 can be inserted into the groove structure 84. Once the flange 76 is inserted into the groove 84, the connector member 20 is further rotated to establish the proper vertical distance between the instrument panel 24 and the console 22 in the manner described above.

While the invention has been described in connection with what is presently considered to be the most practical and preferred embodiment, it is to be understood that the invention is not to be limited to the disclosed embodiment, but is intended to cover various modifications and equivalent arrangements included within the scope of the appended claims. Thus, it is to be understood that variations in the particularly described method, apparatus, and article of manufacture of the present invention can be made without departing from the novel aspects of this invention as defined in the claims.

I claim:

1. A fastener assembly for attaching and aligning two panels, said fastener assembly comprising:

a connector member having a head, a threaded portion and an annular groove, a support platform mounted on a first of said two panels wherein said first panel is one of an instrument panel and a console, said support platform threadingly engaging said threaded portion of said connector member, a tab mounted on a second of said two panels wherein said second panel is the other of an instrument panel and a console, said tab having an opening for receiving said annular groove of said connector member in a supporting relation, and said opening having a slotted end sized to receive said annular groove in sliding fit, whereafter rotation of said connector member responsively moves said second of said two panels towards said first of said two panels in a direction of draw when rotated in a first direction and responsively moves said second of said two panels away from said first of said two panels when rotated in a second direction opposite from said first direction.

2. A fastener assembly as claimed in claim 1 wherein said fastener assembly further comprises an alignment platform mounted on said first of said two panels, said alignment platform slidingly engaging said connector member to generally align said connector member in said direction of draw.

3. A fastener assembly as claimed in claim 2 wherein said alignment platform has a slot for receiving said connector member.

4. A fastener assembly as claimed in claim 1, 2 or 3 wherein said threaded portion is spaced from said head and said annular groove is distal from said head.

5. A fastener assembly as claimed in claim 4 wherein said opening is a keyhole having a wide end sized to receive said connector member and a slotted end sized to receive said annular groove in a sliding fit.

6. A fastener assembly as claimed in claim 4 wherein said first of said two panels is a supporting panel and said second of said two panels is a supported panel.

7. A method for installing a console to an instrument panel, said method comprising:
    pre-assembling a connector member to the instrument panel, the connector member having an annular groove,
    providing said console with a tab, said tab having an opening with a slotted end for receiving said annular groove of said connector member,
    interengaging said connector member with said tab in a supporting relation by sliding said annular groove into said slotted end, and
    rotating the connector member to move said console towards said instrument panel in a direction of draw when rotated in a first direction and rotating the connector member to move said console away from said instrument panel in a direction of draw when rotated in a second direction opposite from said first direction.

8. A method as claimed in claim 7 wherein said method further comprises maintaining said connector member in an orientation of the direction of draw.

9. A method as claimed in claim 7 or 8, wherein said method comprises a preliminary step of providing an access opening in the supported panel.

10. A method as claimed in claim 7 wherein said step of pre-assembling comprises threadingly engaging said connector member to said supported panel.

11. A fastener assembly for attaching and aligning two panels, said fastener assembly comprising:
    a connector member having first and second distal ends with a head being mounted to said first distal end, and an annular groove being disposed on said second distal end, and a threaded portion being disposed between said first and second distal ends,
    a support platform mounted on a first of said two panels defining an actuation area and a mounting area, said threaded portion of said connector member threadingly engaging said support platform to support said connector member on said first panel with said head being disposed within said actuation area and said groove being disposed within said mounting area,
    a tab mounted on a second of said two panels, said tab having an opening for receiving said annular groove of said connector member in a supporting relation when said tab is disposed within said mounting area, and
    at least one of said first and second panels defining a panel opening for providing access to said actuation area such that said head may be actuated to provide rotation of said connector member which responsively moves said second panel toward said first panel when said connector member is rotated in a first direction and responsively moves said second panel away from said first panel when said connector member is rotated in a second direction opposite from said first direction.

12. A fastener assembly as claimed in claim 11 wherein said fastener assembly further comprises an alignment platform mounted on said first of said two panels, said alignment platform slideingly engaging said connector member to generally align said connector member in said direction of draw.

13. A fastener assembly as claimed in claim 12 wherein said alignment platform has a slot for receiving said connector member.

14. A fastener assembly as claimed in claim 11 wherein said opening in said tab has a keyhole configuration with a wide end sized to receive said connector member and a slotted end sized to receive said annular groove in a sliding fit.

* * * * *